United States Patent
Lerner et al.

(10) Patent No.: US 7,300,156 B2
(45) Date of Patent: *Nov. 27, 2007

(54) PRISM ASSEMBLY FOR SEPARATING LIGHT

(75) Inventors: Scott Lerner, Corvallis, OR (US); Anurag Gupta, Corvallis, OR (US); James W. Ring, Blodgett, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

This patent is subject to a terminal disclaimer.

(21) Appl. No.: 11/064,165

(22) Filed: Feb. 23, 2005

(65) Prior Publication Data

US 2006/0132718 A1  Jun. 22, 2006

Related U.S. Application Data

(63) Continuation-in-part of application No. 11/013,868, filed on Dec. 16, 2004.

(51) Int. Cl.
*G03B 21/00* (2006.01)
*G03B 21/28* (2006.01)
*G03B 21/14* (2006.01)
*H04N 9/12* (2006.01)
*H04N 3/24* (2006.01)

(52) U.S. Cl. ............. 353/31; 353/33; 353/81; 353/84; 348/742; 348/743; 348/744; 359/634

(58) Field of Classification Search ............ 353/31, 353/33, 84, 81; 348/742–744; 359/634
See application file for complete search history.

(56) References Cited

U.S. PATENT DOCUMENTS

| | | | |
|---|---|---|---|
| 2,642,487 A | 6/1953 | Schroeder | |
| 3,802,763 A * | 4/1974 | Cook et al. | 359/633 |
| 3,932,027 A * | 1/1976 | Cook et al. | 359/583 |
| 4,161,349 A | 7/1979 | Norman | |
| 4,464,015 A | 8/1984 | Shafer | |
| 5,546,200 A | 8/1996 | Nicolas et al. | |
| 5,754,260 A * | 5/1998 | Ooi et al. | 349/10 |
| 5,892,623 A | 4/1999 | Bradley | |
| 5,993,007 A * | 11/1999 | Jung | 353/34 |
| 6,019,474 A | 2/2000 | Doany et al. | |
| 6,233,084 B1 * | 5/2001 | Owen et al. | 359/247 |
| 6,238,051 B1 | 5/2001 | Huang | |
| 6,327,092 B1 * | 12/2001 | Okuyama | 359/634 |
| 6,342,980 B1 | 1/2002 | Omuro | |
| 6,412,972 B1 | 7/2002 | Pujol et al. | |

(Continued)

FOREIGN PATENT DOCUMENTS

EP   0 217 503 A   4/1987

(Continued)

*Primary Examiner*—Melissa Jan Koval

(57) ABSTRACT

A prism assembly is provided. The prism assembly comprises a first prism component having a triangular cross-section along an optical path, a second prism component having a first quadrilateral cross-section along the optical path, a third prism component having a second quadrilateral cross-section along the optical path, a first dichroic interface between the first and second prism components and along the third prism component and configured to reflect a first range of wavelengths of the light, and a second dichroic interface between the first and third prism components and along the second prism component and configured to reflect a second range of wavelengths of the light.

31 Claims, 6 Drawing Sheets

U.S. PATENT DOCUMENTS

| | | | |
|---|---|---|---|
| 6,498,632 B1 * | 12/2002 | Butterworth et al. | 349/77 |
| 6,517,209 B2 * | 2/2003 | Huang | 353/81 |
| 6,786,604 B2 * | 9/2004 | Aastuen et al. | 353/20 |
| 7,224,531 B2 * | 5/2007 | Ho et al. | 359/634 |
| 2006/0007401 A1 | 1/2006 | Ho et al. | |

FOREIGN PATENT DOCUMENTS

| | | |
|---|---|---|
| EP | 1 006 391 A | 6/2000 |
| EP | 1 227 687 A | 7/2002 |
| JP | 63-253902 | 10/1988 |
| JP | 2001-100155 | 4/2001 |
| JP | 2001-174756 | 6/2001 |
| JP | 2001-281612 | 10/2001 |
| JP | 2002-049019 | 2/2002 |

* cited by examiner

PRISM ASSEMBLY FOR SEPARATING LIGHT

REFERENCE TO RELATED APPLICATION

This application is a continuation-in-part of commonly assigned U.S. patent application Ser. No. 11/013,868, filed Dec. 16, 2004, of which priority is hereby claimed.

BACKGROUND

Optical architectures of digital projectors typically include an illumination system, projection system, an optical modulator and one or more devices that couple the illumination system, projection system and the optical modulator. The illumination system illuminates the optical modulator. The optical modulator produces images by modulating the light falling across it by either reflecting or transmitting the light. The projection system images the optical modulator on the screen by capturing the modulated illumination of the optical modulator.

Generally, optical architectures have the optical axes of the projection and illumination paths either overlapping (across a portion of the system) or tilted substantially with respect to each other. For those systems that require or might benefit from a relatively on-axis or small incident angle illumination and projection paths on the optical modulator plane, such architectures may be inefficient, noisy, bulky or expensive. It would be desirable to be able to obtain high efficiency and low stray light in a compact package at a low cost in an optical architecture.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense.

As described herein, an optical architecture is provided for a digital projector that sets the optical axes of an illumination system and a projection system to be parallel and offset with respect to each other using coupling optics. The coupling optics allow the sharing of projection and illumination path spaces while maintaining the separation of the actual projection and illumination beams. By doing so, the architecture effectively separates the illumination and projection beam paths throughout the system.

In one embodiment, the coupling optics include a prism assembly. The prism assembly comprises a first prism component having a triangular cross-section along an optical path, a second prism component having a first quadrilateral cross-section along the optical path, a third prism component having a second quadrilateral cross-section along the optical path, a first dichroic interface between the first and second prism components and along the third prism component and configured to reflect a first range of wavelengths of the light, and a second dichroic interface between the first and third prism components and along the second prism component and configured to reflect a second range of wavelengths of the light.

Figure 1:
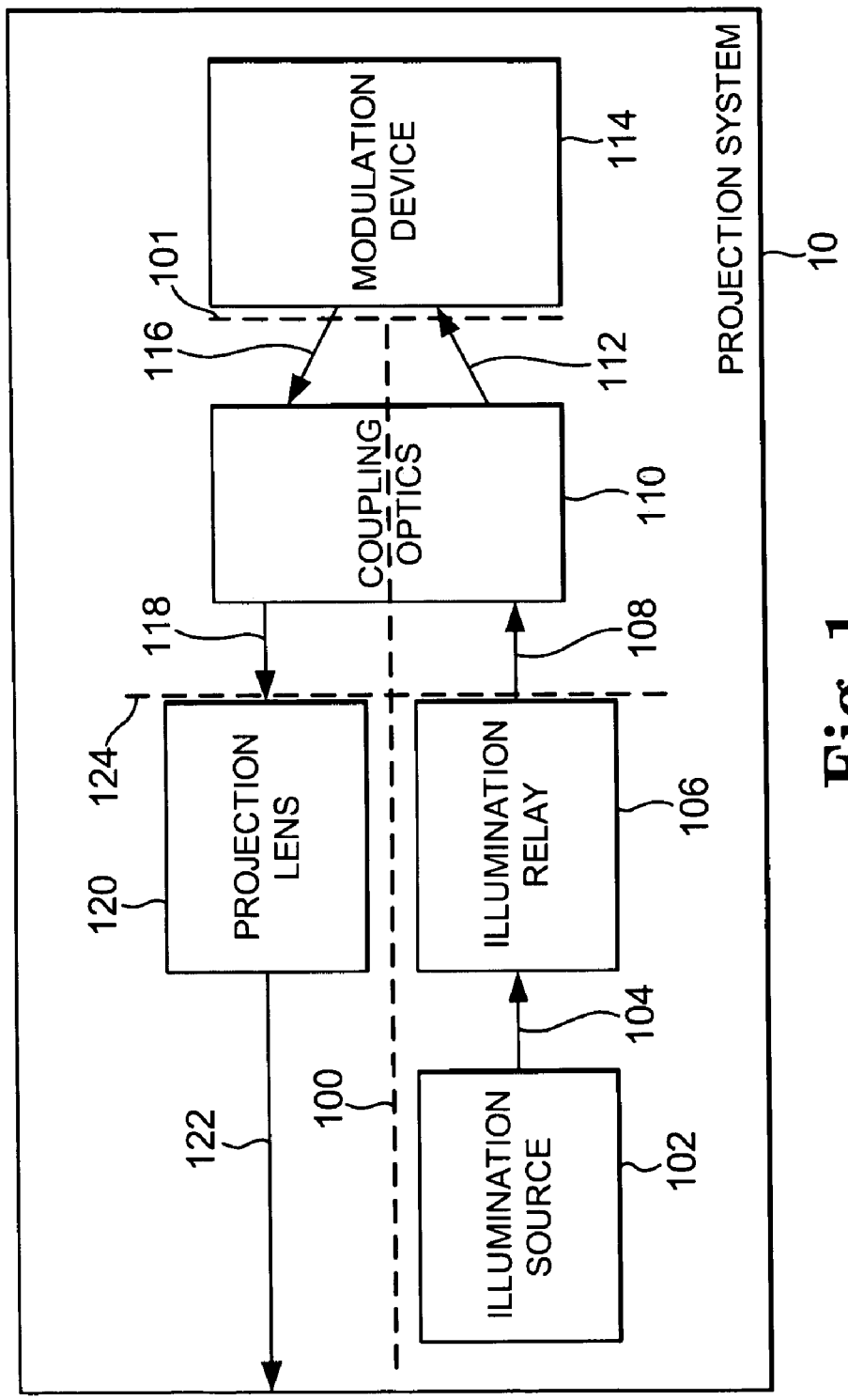
FIG. 1 is a block diagram illustrating an offset digital projection system according to one embodiment of the present invention.

FIG. 1 is a block diagram illustrating one embodiment of an offset digital projection system 10. In projection system 10, an illumination source 102 generates and emits an illumination beam to an illumination relay 106 along an optical path 104. Illumination relay 106 integrates and collimates the illumination beam and provides the illumination beam to a coupling optics 110 along an illumination path 108 such that an optical axis of illumination path 108 is parallel or substantially parallel to a normal 100 to a plane 101 of a modulation device 114. Normal 100 is substantially perpendicular to plane 101, and plane 101 aligns with the modulating elements (not shown) of modulation device 114. Coupling optics 110 directs and focuses the illumination beam onto modulation device 114 along an illumination path 112. Illumination relay 106 images illumination source 102 onto modulation device 114 via coupling optics 110 such that modulation device 114 is uniformly illuminated with minimum overfill. Coupling optics 110 directs the illumination beam onto modulation device 114 at a non-zero angle of incidence. Coupling optics 110 are substantially centered with respect to modulation device 114.

Modulation device 114 modulates the illumination beam from coupling optics 110 according to an input signal, e.g., a computer or video input signal, (not shown) to form an imaging beam. The imaging beam is reflected from modulation device 114 through coupling optics 110 along an optical path 116. Coupling optics 110 directs the imaging beam from modulation device 114 through a projection lens 120 along a projection path 118 that an optical axis of projection path 118 is parallel or substantially parallel to normal 100 and the optical axis of illumination path 108. Projection lens 120 focuses and may zoom the imaging beam along an optical path 122 to cause still or video images to be formed on a screen or other display surface. Projection lens 120 images modulation device 114 through coupling optics 110 onto the screen or other display surface used for final display.

In projection system 10, illumination relay 106, coupling optics 110, and projection lens 120 are situated so as to minimize the overlap of the illumination and imaging beams along illumination path 108 and projection path 118. In particular, the illumination beam and the imaging beam each intersect different areas of an optical pupil plane 124 of the system such that the imaging beam is spatially separated from the illumination beam at pupil plane 124. Accordingly, illumination path 108 is effectively separated from projection path 118. As shown in FIG. 1, coupling optics 110 includes all optical elements between pupil plane 124 and modulation device 114.

Illumination source 102 may be a mercury ultra high pressure, xenon, metal halide, or other suitable projector lamp that provides a monochromatic or polychromatic illumination beam. Modulation device 114 transmits or reflects selected portions of the illumination beam through coupling optics 110 and projection lens 120 in response to an image input signal (not shown) to cause images to be projected onto a screen or other surface. Modulation device 114 comprises at least one digital modulator such as a spatial light modulator like LCos, liquid crystal display (LCD), digital micromirror display (DMD) or other type. In one embodiment, modulation device 114 includes a separate digital modulator for each color, e.g., red, blue, and green.

Figure 5:
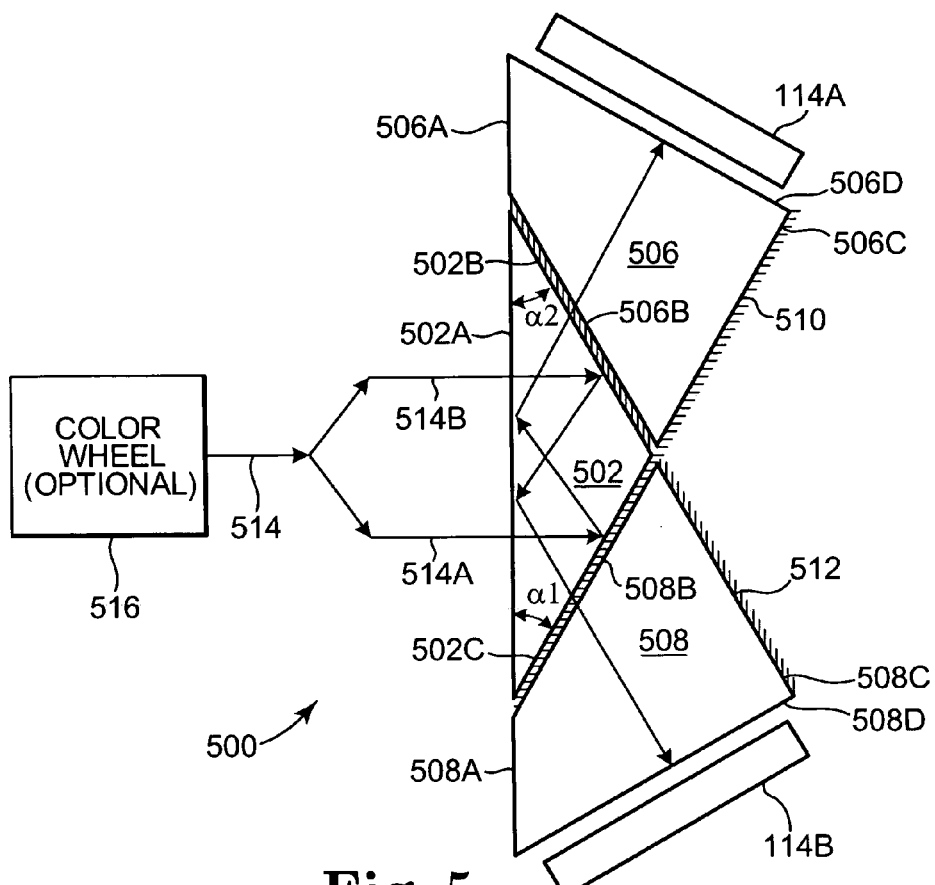
FIG. 5 is a schematic diagram illustrating a prism assembly according to one embodiment of the present invention.
Figure 7:
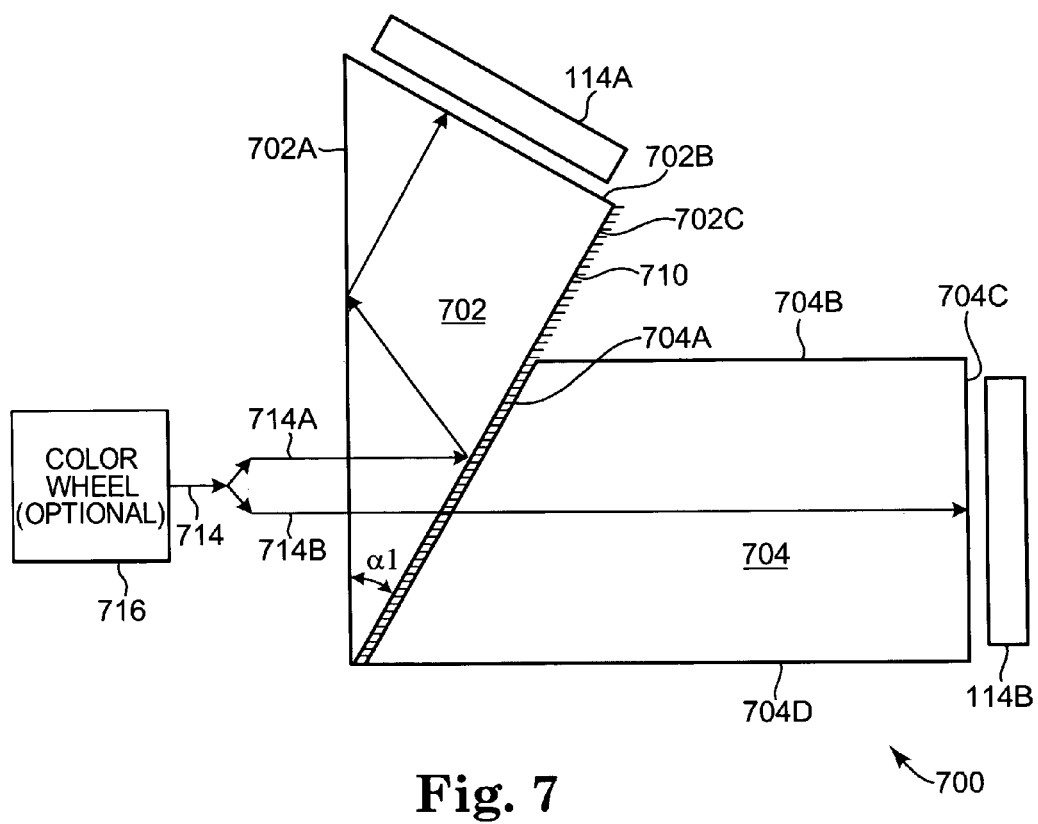
FIG. 7 is a schematic diagram illustrating a prism assembly according to one embodiment of the present invention.

Coupling optics 110 may include one or more color separation components such as the embodiment of prism assembly 500 shown in FIG. 5 or the embodiment of prism assembly 700 shown in FIG. 7.

Figure 2:
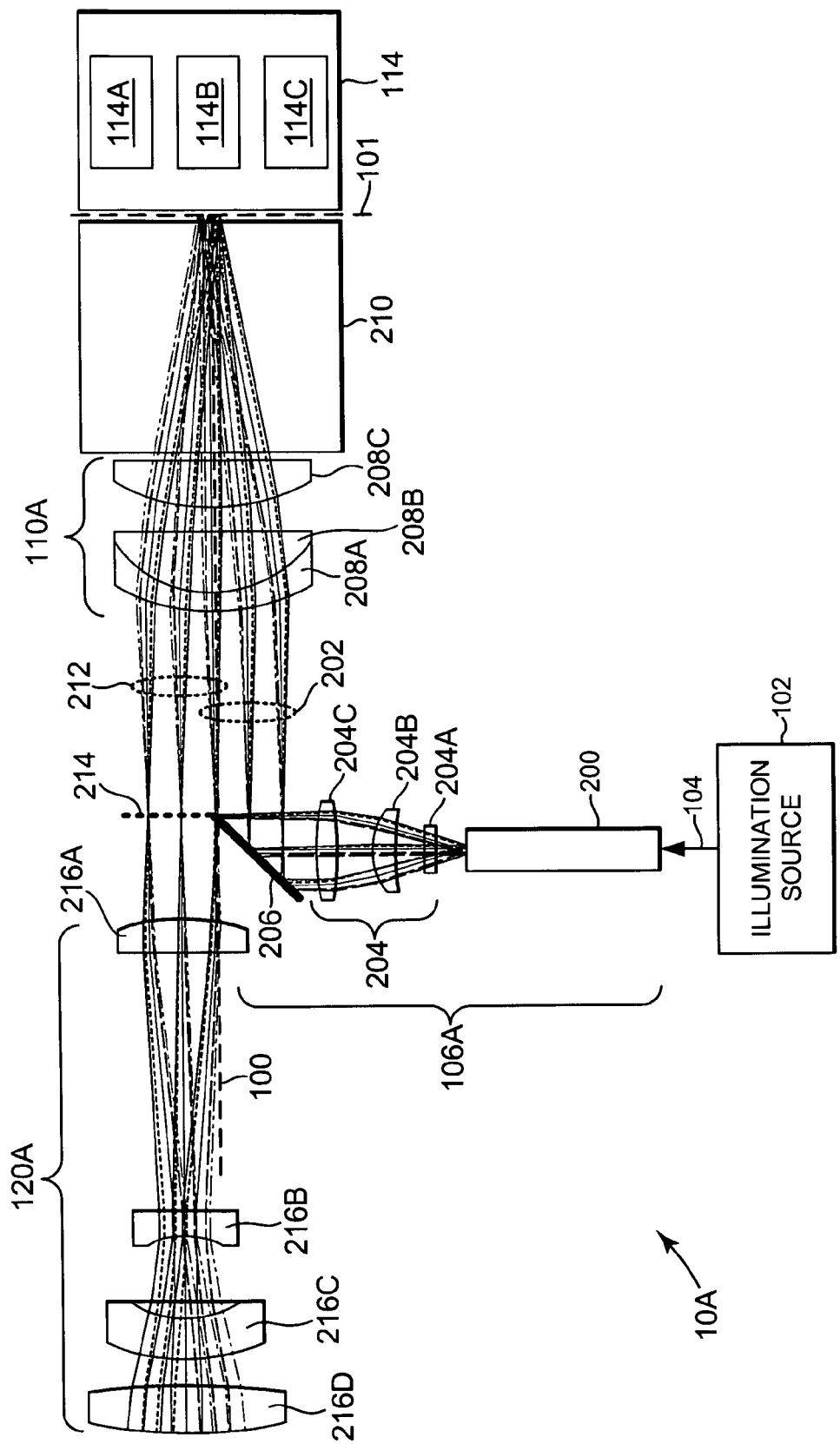
FIG. 2 is a schematic diagram illustrating an offset digital projection system according to one embodiment of the present invention.

FIG. 2 is a schematic diagram illustrating one embodiment of an offset digital projection system 10A. In projection system 10A, illumination source 102 generates and emits an illumination beam 202 to an illumination relay 106A along an optical path 104. Illumination relay 106A includes an integrating rod 200 that integrates illumination beam 202 and an illumination lens 204 that collimates illumination beam 202 and provides illumination beam 202 to a fold mirror 206. Illumination lens 204 includes lenses 204A, 204B, and 204C.

Fold mirror 206 reflects illumination beam 202 from illumination lens 204 through a coupling lens 110A along an illumination path such that an optical axis of the illumination path of illumination beam 202 is parallel or substantially parallel to an optical axis of modulation device 114 between fold mirror 206 and coupling lens 110A. In the embodiment shown in FIG. 2, fold mirror 206 reflects illumination beam 202 at an angle of approximately ninety degrees between the optical axis of illumination lens 204 and the optical axis of coupling lens 110A. In other embodiments, fold mirror 206 may be positioned differently to reflect illumination beam 202 at any non-zero angle between the optical axis of illumination lens 204 and the optical axis of coupling lens 110A.

Coupling lens 110A refracts and focuses illumination beam 202 onto modulation device 114 through a beamsplitter 210. Beamsplitter 210 separates illumination beam 202 into separate components (e.g., red, blue, and green components) that are provided to different modulators 114A, 114B, and 114C of modulation device 114. Modulators 114A, 114B, and 114C may be set in any suitable arrangement with respect to beamsplitter 210. Beamsplitter 210 may be the embodiment of prism assembly 500 as shown in FIG. 5 or the embodiment of prism assembly 500 as shown in FIG. 7. Beamsplitter 210 may be omitted in embodiments where modulation device 114 includes a single modulator. Coupling lens 110A refracts illumination beam 202 onto modulation device 114 at a non-zero angle of incidence. Coupling lens 11A, as shown, includes three lenses: 208A, 208B and 208C to refract illumination beam 202. In other embodiments, coupling lens 110A may be a combination of one or more spherical or aspherical lenses.

Modulation device 114 modulates the illumination beam from coupling lens 110A according to an input signal, e.g., a computer or video input signal, (not shown) to form an imaging beam 212. Imaging beam 212 is reflected from modulation device 114 through beamsplitter 210 and into coupling lens 110A. Coupling lens 110A refracts imaging beam 212 from modulation device 114 through a projection lens 120A using lenses 208A, 208B, and 208C such that imaging beam 212 travels along an optical axis of a projection path that is parallel or substantially parallel to normal 100 to plane 101 of modulation device 114 and an optical axis of the illumination path of illumination beam 202 between coupling lens 110A and an optical pupil plane 214.

Projection lens 120A focuses and may zoom imaging beam 212 along an optical path to cause still or video images to be formed on a screen or other display surface. Projection lens 120A, as shown, includes four lenses: 216A, 216B, 216C, and 216D. In other embodiments, projection lens 120A may be a combination of one or more spherical or aspherical lenses or mirrors.

In projection system 10A, illumination relay 106A, coupling lens 110A, and projection lens 120A are situated so as to minimize the overlap of illumination beam 202 and imaging beam 212 along the respective illumination and projection paths. In particular, the illumination beam and the imaging beam each intersect different areas of pupil plane 214 of the system such that imaging beam 212 is spatially separated from illumination beam 202 at pupil plane 214. Accordingly, the illumination path is effectively separated from the projection path. As shown in FIG. 2, coupling lens 110A comprises all optical elements between pupil plane 214 and modulation device 114.

Figure 3:
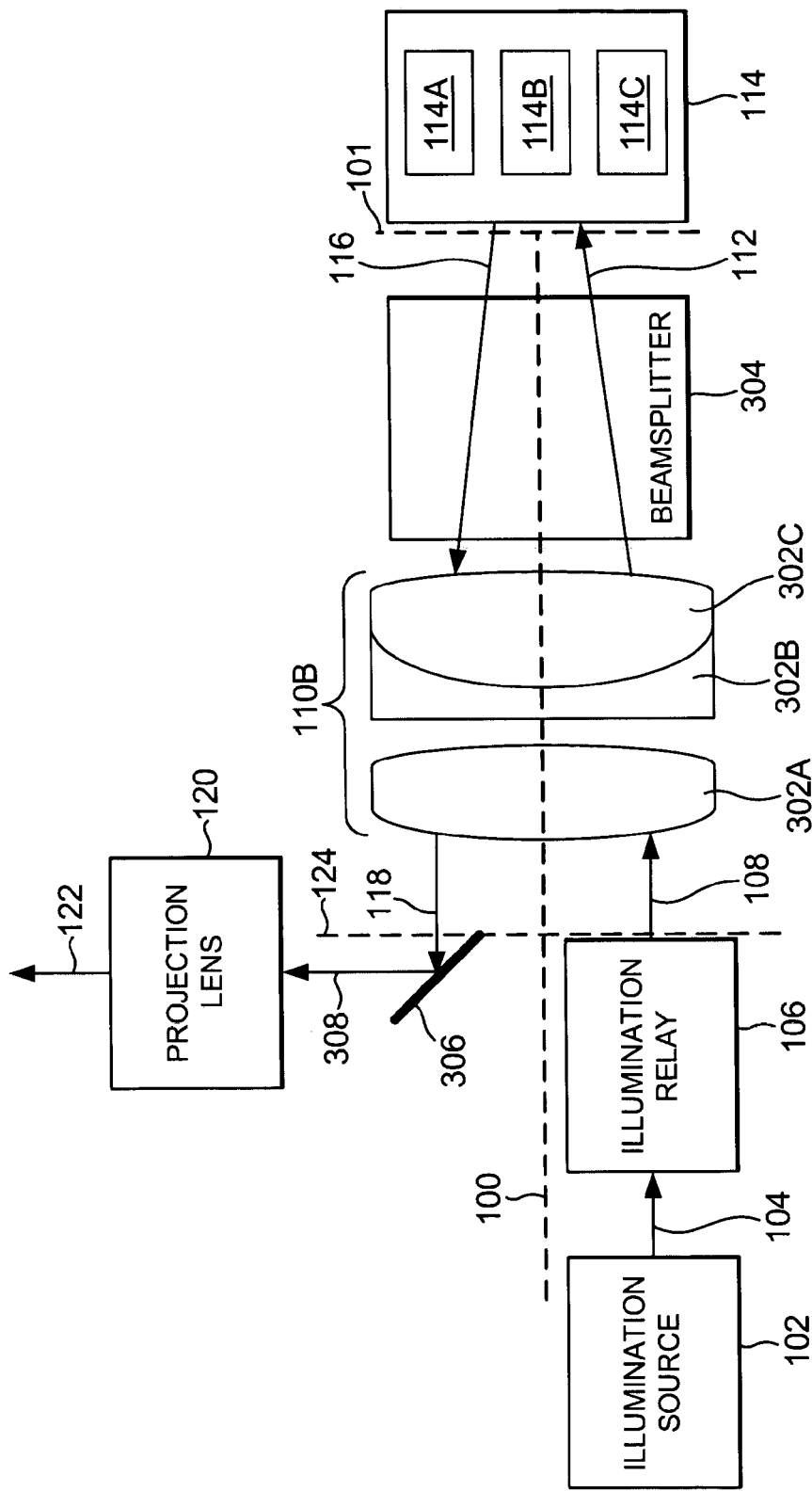
FIG. 3 is a schematic diagram illustrating an offset digital projection system according to one embodiment of the present invention.

FIG. 3 is a schematic diagram illustrating one embodiment of an offset digital projection system 10B. In projection system 10B, illumination source 102 generates and emits an illumination beam to illumination relay 106 along an optical path 104. Illumination relay 106 integrates and collimates the illumination beam and provides the illumination beam to coupling lens 110B along an illumination path 108 such that an optical axis of illumination path 108 is parallel or substantially parallel to normal 100 to plane 101 of modulation device 114 between illumination relay 106 and coupling lens 110B.

Coupling lens 110B refracts and focuses the illumination beam onto modulation device 114 through a beam splitter 304. Beam splitter 304 separates the illumination beam into separate components (e.g., red, blue, and green components) that are provided to different modulators 114A, 114B, and 114C of modulation device 114. Modulators 114A, 114B, and 114C may be set in any suitable arrangement with respect to beamsplitter 304. Beamsplitter 304 may be an embodiment of prism assembly 500 as shown in FIG. 5 or an embodiment of prism assembly 500 as shown in FIG. 7. Beamsplitter 304 may be omitted in embodiments where modulation device 114 includes a single modulator. Coupling lens 110B refracts the illumination beam onto modulation device 114 at a non-zero angle of incidence as indicated by an optical path 112. Coupling lens 110B, as shown, includes three lenses: 302A, 302B and 302C to refract the illumination beam. In other embodiments, coupling lens may be a combination of one or more spherical or aspherical lenses.

Modulation device 114 modulates the illumination beam from coupling lens 110A according to an input signal, e.g., a computer or video input signal, (not shown) to form an imaging beam. The imaging beam is reflected from modulation device 114 along an optical path 116 through beamsplitter 304 and into coupling lens 110B. Coupling lens 110B refracts the imaging beam from modulation device 114 to a fold mirror 306 using lenses 302A, 302B, and 302C such that the imaging beam travels along an optical axis of a projection path 118 that is parallel or substantially parallel to normal 100 to plane 101 of modulation device 114 and an optical axis of illumination path 108 of the illumination beam.

Fold mirror 306 reflects the imaging beam from coupling lens 110B into projection lens 120 along an optical path 308. In the embodiment shown in FIG. 3, fold mirror 306 reflects the imaging beam at an angle of approximately ninety degrees between normal 100 and optical axis 308 of projection lens 120. In other embodiments, fold mirror 306 may be positioned differently to reflect the imaging beam at any non-zero angle between normal 100 and optical axis 308 of projection lens 120. Projection lens 120 focuses and may zoom the imaging beam from fold mirror 306 along optical path 122 to cause still or video images to be formed on a screen or other display surface.

In projection system 10B, illumination relay 106, coupling lens 110B, and projection lens 120 are situated so as to minimize the overlap of the illumination and imaging beams along illumination path 108 and projection path 118. In particular, the illumination beam and the imaging beam each intersect different areas of pupil plane 124 of the system such that the imaging beam is spatially separated from the illumination beam at pupil plane 124. Accordingly, illumination path 108 is effectively separated from projection path 118.

Figure 4:
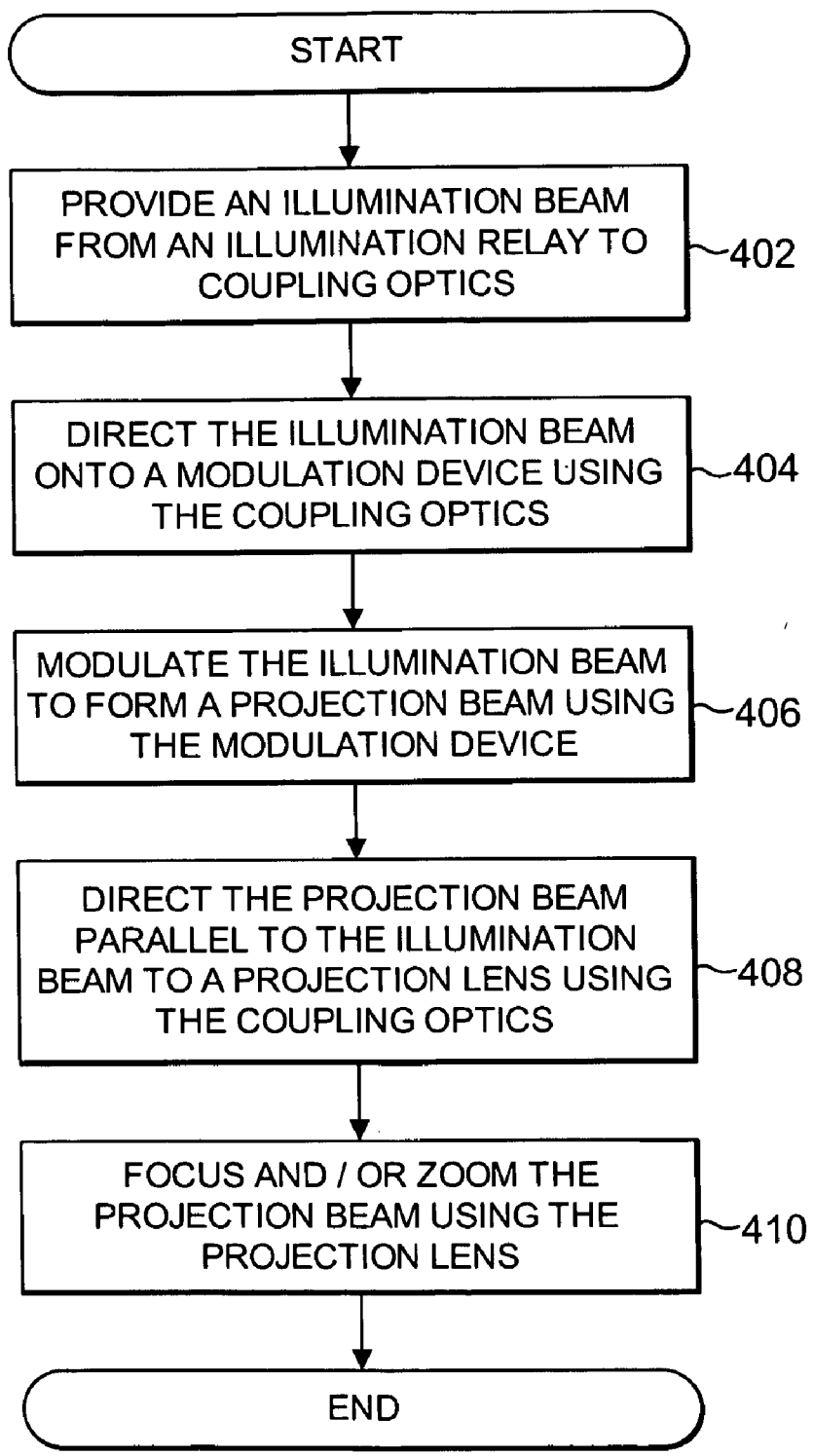
FIG. 4 is a flow chart illustrating a method for projecting an image using an offset digital projection system according to one embodiment of the present invention.

FIG. 4 is a flow chart illustrating one embodiment of a method for projecting an image using an offset projection system. In FIG. 4, an illumination beam is provided from an illumination relay to coupling optics as indicated in a block 402. The illumination beam is directed onto a modulation device using the coupling optics as indicated in a block 404. The illumination beam is modulated to form an imaging beam using the modulation device as indicated in a block 406. The imaging beam is directed parallel or substantially parallel to the illumination beam and a normal to the plane of the modulation device to a projection lens using the coupling optics as indicated in a block 408. The imaging beam is focused and may be zoomed in or out using the projection lens as indicated in a block 410.

In other embodiments, one or both of fold mirrors 206 and 306 may replaced with other reflective surfaces. In addition, a system may include fold mirrors in both the illumination and projection paths in other embodiments.

An offset optical architecture as described herein may effectively separate the illumination and projection paths while maintaining the optical performance and highest possible efficiency and minimizing stray light. This architecture may also avoid complex and expensive optical components and may allow for a compact package that has a maximum number of small sized lenses to achieve a low cost compact system.

FIG. 5 is a schematic diagram illustrating an embodiment of a prism assembly 500 from a top view. Prism assembly 500 may be used as part of coupling optics 110 in FIG. 1 and in place of beamsplitter 210 in FIG. 2 and beamsplitter 304 in FIG. 3. Accordingly, prism assembly 500 separates light from the illumination paths and combines light from the projection paths in the embodiments of FIGS. 2 and 3. In other embodiments, prism assembly 500 separates light from an illumination path and/or combines light from a projection path.

Prism assembly 500 includes prism components 502, 506, and 508. Prism 502 includes faces 502A, 502B, and 502C where faces 502A, 502B, and 502C are arranged substantially orthogonal to the optical path of light 514 and form a triangular cross-section. Prism 506 includes faces 506A, 506B, 506C, and 506D where faces 506A, 506B, 506C, and 506D are arranged substantially orthogonal to the optical path of light 514 and form a quadrilateral cross-section. Prism 508 includes faces 508A, 508B, 508C, and 508D where faces 508A, 508B, 508C, and 508D are arranged substantially orthogonal to the optical path of light 514 and form a quadrilateral cross-section. Prism assembly 500 also includes a first dichroic interface 510 between faces 502C and 508B and along face 506C and a second dichroic interface 512 between faces 502B and 506B and along face 508C. Prism assembly 500 optionally operates in conjunction with a color wheel 516 as described in certain embodiments below.

In operation, prism assembly 500 receives light 514 from illumination relay 106 or 106A through face 502A and separates light 514 into two colors 514A and 514B. Each of the two colors corresponds to a mutually exclusive wavelength range of light such that each color may encompass one or more than one color range. For example, first color 514A may encompass the range of wavelengths that include red, and second color 514B may encompass the range of wavelengths that include green and blue. In FIG. 5, colors 514A and 514B are shown schematically as being separate for illustration purposes. Light 514 passes through prism 502 onto first dichroic interface 510 and second dichroic interface 512. First dichroic interface 510 transmits the second color 514B, and second dichroic interface 512 transmits the first color 514A.

First color 514A reflects off of first dichroic interface 510 and totally internally reflects off of faces 502A and 506A onto modulator 114A through face 506D. More particularly, a first portion of first color 514A reflects off of the portion of first dichroic interface 510 between faces 502C and 508B, totally internally reflects off of face 502A, transmits through the portion of second dichroic interface 512 between faces 502B and 506B, and transmits through prism 506 onto modulator 114A through face 506D. A second portion of first color 514A transmits through the portion of second dichroic interface 512 between faces 502B and 506B into prism 506, reflects off of the portion of first dichroic interface 510 along face 506C, and totally internally reflects off of face 506A onto modulator 114A through face 506D.

Second color 514B reflects off of second dichroic interface 512 and totally internally reflects off of face 502A onto modulator 114B through face 508D. More particularly, a first portion of second color 514B reflects off of the portion of second dichroic interface 512 between faces 502B and 506B, totally internally reflects off of face 502A, transmits through the portion of first dichroic interface 510 between faces 502C and 508B, and transmits through prism 508 onto modulator 114B through face 508D. A second portion of second color 514B transmits through the portion of first dichroic interface 510 between faces 502C and 508B into prism 508, reflects off of the portion of second dichroic interface 512 along face 508C, and totally internally reflects off of face 508A onto modulator 114B through face 508D.

Modulators 114A and 114B modulate colors 514A and 514B, respectively, to selectively reflect light from colors 514A and 514B back through prism assembly 500 and along a projection path to form images as described above with reference to FIGS. 2 and 3.

In one embodiment, modulator 114B is configured to selectively, alternately reflect light for two different colors (i.e., two mutually exclusive subsets of the wavelength range of second color 514B) of second color 514B during different time periods. For example, second color 514B may include blue and green light such that modulator 114B reflects the green light during a first time period and modulator 114B reflects the blue light during a second time period that is subsequent to the first time period.

In another embodiment, color wheel 516 is configured to alternately provide light for two different colors (i.e., two mutually exclusive wavelength ranges) of second color 514B to modulator 114B during different time periods. For example, second color 514B may include blue and green light such that color wheel 516 provides the green light during a first time period to cause modulator 114B to selectively reflect the green light and color wheel 516 provides the blue light during a second time period that is subsequent to the first time period to cause modulator 114B to selectively reflect the blue light.

Angles $\alpha 1$ and $\alpha 2$ of prism 502 are set to provide a relatively shallow angle of incidence of first color 514A on first dichroic interface 510 and a relatively shallow angle of incidence of second color 514B on second dichroic interface 512, respectively. Angles $\alpha 1$ and $\alpha 2$ of prism 502 are also set to ensure total internal reflection of colors 514A and 514B off of faces 502A, 506A, and 508A as described above. In one embodiment, angles $\alpha 1$ and $\alpha 2$ are each set to approximately 30 degrees. In other embodiments, angles $\alpha 1$ and $\alpha 2$ are each set to other values.

Prism components 502, 506, and 508 are selected such that the path lengths of colors 514A and 514B between face 502A and modulators 114A and 114B, respectively, are substantially equal. Prism components 502, 506, and 508 may also be selected such that the path lengths are as short as possible. In one embodiment prism components 502, 506, and 508 each comprise BK7 glass with an index of refraction of approximately 1.517. In other embodiments, prism components 502, 506, and 508 each comprise another type of glass with a different index of refraction.

In one embodiment, dichroic interfaces 510 and 512 each comprise a series of dielectric coatings applied to prism components 502, 506, and/or 508. In other embodiments, dichroic interfaces 510 and 512 may be formed in other ways.

Figure 6:
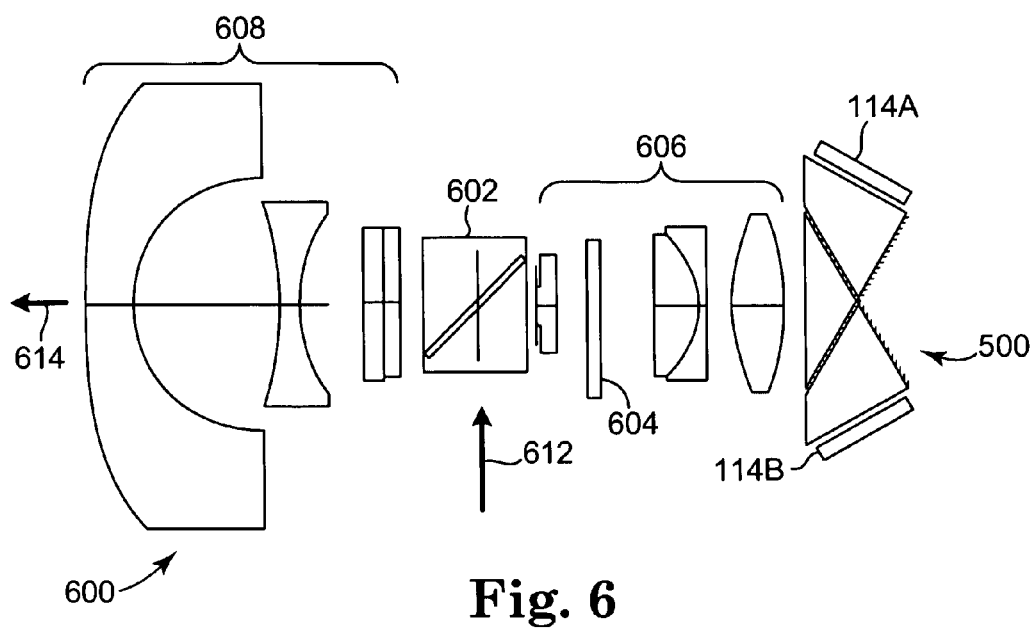
FIG. 6 is a block diagram illustrating an on-axis digital projection system according to one embodiment of the present invention.

FIG. 6 is a block diagram illustrating an on-axis digital projection system 600 that includes prism assembly 500. System 600 also includes a polarizing beamsplitter 602, a retarder 604, a set of illumination lenses 606, a set of projection lenses 608, and modulators 114A and 114B.

In operation, light 612 is polarized and reflected by polarizing beamsplitter 602 through retarder 604 and illumination lenses 606 into prism assembly 500. Light 612 is selected reflected by modulators 114A and 114B back through prism assembly 500, illumination lenses 606, and retarder 604 to form an imaging beam. Retarder 604 rotates the polarization of the imaging beam and transmits the imaging beam through polarizing beamsplitter 602 and projection lenses 608 to form a projection beam 614.

In other embodiments, retarder 604 may be replaced by retarders disposed between prism assembly 500 and modulators 114A and 114B. More particularly, a first retarder (not shown) may be disposed between face 506D of prism component 506 and modulator 114A and a second retarder (not shown) may be disposed between face 508D of prism component 508 and modulator 114B.

FIG. 7 is a schematic diagram illustrating an embodiment of a prism assembly 700 from a top view. Prism assembly 700 may be used as part of coupling optics 110 in FIG. 1 and in place of beamsplitter 210 in FIG. 2 and beamsplitter 304 in FIG. 3. Accordingly, prism assembly 700 separates light from the illumination paths and combines light from the projection paths in the embodiments of FIGS. 2 and 3. In other embodiments, prism assembly 700 separates light from an illumination path and/or combines light from a projection path.

Prism assembly 700 includes prism components 702 and 704. Prism 702 includes faces 702A, 702B, and 702C where faces 702A, 702B, and 702C are arranged substantially orthogonal to the optical path of light 714 and form a triangular cross-section. Prism 704 includes faces 704A, 704B, 704C, and 704D where faces 704A, 704B, 704C, and 704D are arranged substantially orthogonal to the optical path of light 714 and form a quadrilateral cross-section. Prism assembly 700 optionally operates in conjunction with a color wheel 716 as described in certain embodiments below.

In operation, prism assembly 700 receives light 714 from illumination relay 106 or 106A through face 702A and separates light 714 into two colors (i.e., two mutually exclusive wavelength ranges) 714A, and 714B (e.g., red and green/blue, respectively). Light 714 passes through prism 702 onto dichroic interface 710. Dichroic interface 710 reflects the first color 714A and transmits the second color 714B.

Color 714A reflects off of dichroic interface 710 and totally internally reflects off of face 702A onto modulator 114A through face 702B. Color 714B transmits through dichroic interface 710 and of prism 704 onto modulator 14B through face 704C.

Modulators 114A and 114B modulate colors 714A and 714B, respectively, to selectively reflect light from colors 714A and 714B back through prism assembly 700 and along a projection path to form images as described above with reference to FIGS. 2 and 3.

In one embodiment, modulator 114B is configured to selectively, alternately reflect light for two different colors (i.e., two mutually exclusive subsets of the wavelength range of color 714B) of color 714B during different time periods. For example, color 714B may include blue and green light such that modulator 114B reflects the green light during a first time period and modulator 114B reflects the blue light during a second time period that is subsequent to the first time period.

In another embodiment, color wheel 7.16 is configured to alternately provide light for two different colors (i.e., two mutually exclusive wavelength ranges) of color 714B to modulator 114B during different time periods. For example, color 714B may include blue and green light such that color wheel 716 provides the green light during a first time period to cause modulator 114B to selectively reflect the green light and color wheel 716 provides the blue light during a second time period that is subsequent to the first time period to cause modulator 114B to selectively reflect the blue light.

Angle $\alpha 1$ of prism 702 is set to provide a relatively shallow angle of incidence of color 714A on dichroic interface 710. Angle $\alpha 1$ of prism 702 is also set to ensure total internal reflection of color 714A off of faces 702A as described above. In one embodiment, angle $\alpha 1$ is set to approximately 30 degrees. In other embodiments, angle $\alpha 1$ is set to other values.

Prism components 702 and 704 are selected such that the path lengths of colors 714A and 714B between face 702A and modulators 114A and 114B, respectively, are substantially equal. Prism components 702 and 704 may also be selected such that the path lengths are as short as possible. In one embodiment prism components 702 and 704 each comprise BK7 glass with an index of refraction of approximately 1.517. In other embodiments, prism components 702 and 704 each comprise another type of glass with a different index of refraction.

In one embodiment, dichroic interface 710 comprises a series of dielectric coatings applied to prism components 702 and/or 704. In other embodiments, dichroic interface 710 may be formed in other ways.

In other embodiments that incorporates prism assembly 500 or prism assembly 700, modulators 114A and 114B each comprise a transmissive liquid crystal display (LCD). In one embodiment, colors 514A and 514B are selectively transmitted through modulators 114A and 114B, respectively, and into faces 506D and 508D, respectively, of prism assembly 500. Prism assembly 500 combines the light from modulators 114A and 114B to transmit images through face 502A of prism component 502. In another embodiment, colors 714A and 714B are selectively transmitted through modulators 114A and 114B, respectively, and into faces 702B and 704C, respectively, of prism assembly 700. Prism assembly 700 combines the light from modulators 114A and 114B to transmit images through face 702A of prism component 702.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the optical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A prism assembly comprising:
   a first prism component having a triangular cross-section along an optical path and having a first face in a plane that is orthogonal to the optical path;
   a second prism component having a first quadrilateral cross-section along the optical path and having a second face in the plane;
   a third prism component having a second quadrilateral cross-section along the optical path and having a third face in the plane;
   a first dicliroic interface between the first and second prism components and along the third prism component and configured to reflect a first range of wavelengths of light; and
   a second dichroic interface between the first and third prism components and along the second prism component and configured to reflect a second range of wavelengths of the light.

2. The prism assembly of claim 1 wherein the optical path comprises an illumination path.

3. The prism assembly of claim 1 wherein the optical path comprises an projection path.

4. The prism assembly of claim 1 wherein the optical path comprises an illumination path and a projection path.

5. The prism assembly of claim 1 wherein the first prism is configured to receive the second range of wavelengths from a color wheel, wherein the second range of wavelengths includes a third range of wavelengths during a first time period, and wherein the second range of wavelengths includes a fourth range of wavelengths that differs from the third range of wavelengths during a second time period.

6. The prism assembly of claim 1 wherein the first prism component includes a first face for receiving the light from the optical path, wherein the first range of wavelengths of the light totally internally reflects off of the first face into the third prism component, and wherein the second range of wavelengths of the light totally internally reflects off of the first face into the second prism component.

7. The prism assembly of claim 6 wherein the second prism component includes a second face, wherein the third prism component includes a third face, wherein the first range of wavelengths of the light totally internally reflects off of the second face of the second prism component, and wherein the second range of wavelengths of the light totally internally reflects off of the third face of the third prism component.

8. The prism assembly of claim 7 wherein the first range of wavelengths of the light transmit through the third prism component onto a first modulation device, and wherein the second range of wavelengths of the light transmit through the second prism component onto a second modulation device.

9. The prism assembly of claim 8 wherein the second modulation device is configured to selectively reflect a first subset of the second range of wavelengths during a first time period, and wherein the second modulation device is configured to selectively reflect a second subset of the second range of wavelengths during a second time period.

10. The prism assembly of claim 1 wherein the first dichroic interface is between a first face of the first prism component and a first face of the second prism component and along a first face of the third prism component, and wherein the second dichroic interface is between a second face of the first prism component and a second face of the third prism component and along a second face of the second prism component.

11. A method for manufacturing a prism assembly, the method comprising:
    providing a first prism component having a triangular cross-section along an optical path;
    providing a second prism component having a first quadrilateral cross-section along the optical path;
    providing a third prism component having a second quadrilateral cross-section along the optical path;
    providing a first dichroic interface between the first and second prism components and along the third prism component and configured to reflect a first range of wavelengths of light; and
    providing a second dichroic interface between the first and third prism components and along the second prism component and configured to reflect a second range of wavelengths of the light; and
    wherein the second range of wavelengths includes a third range of wavelengths during a first time period, and wherein the second range of wavelengths includes a fourth range of wavelengths that differs from the third range of wavelengths during a second time period.

12. The method of claim 11 wherein the first prism component includes a first face for receiving the light from the optical path, wherein the first range of wavelengths of the light totally internally reflects off of the first face into the third prism component, and wherein the second range of wavelengths of the light totally internally reflects off of the first face into the second prism component.

13. The method of claim 12 wherein the second prism component includes a second face, wherein the third prism component includes a third face, wherein the first range of wavelengths of the light totally internally reflects off of the second face of the second prism component, and wherein the second range of wavelengths of the light totally internally reflects off of the third face of the third prism component.

14. The method of claim 13 wherein the first range of wavelengths of the light transmit through the third prism component onto a first modulation device, and wherein the second range of wavelengths of the light transmit through the second prism component onto a second modulation device.

15. The method of claim 14 wherein the second modulation device is configured to selectively reflect the third range of wavelengths during the first time period, and wherein the second modulation device is configured to selectively reflect the fourth range of wavelengths during the second time period.

16. The method of claim 11 wherein the first dichroic interface is between a first face of the first prism component and a first face of the second prism component and along a first face of the third prism component, and wherein the second dichroic interface between a second face of the first prism component and a second face of the third prism component and along a second face of the second prism component.

17. A method comprising:
reflecting a first range of wavelengths of light from a first prism component off of a first dichroic interface;
reflecting a second range of wavelengths of the light from the first prism component off of a second dichroic interface;
totally internally reflecting the first range of wavelengths and the second range of wavelengths off of a first face of the first prism component;
totally internally reflecting the first range of wavelengths off of a second face of a second prism component; and
totally internally reflecting the second range of wavelengths off of a third face of a third prism component.

18. The method of claim 17 further comprising:
transmitting the second range of wavelengths of the light from the first prism component through the first dichroic interface.

19. The method of claim 17 further comprising:
transmitting the first range of wavelengths of the light from the first prism component through the second dichroic interface.

20. The method of claim 17 wherein the second range of wavelengths includes a third range of wavelengths during a first time period, and wherein the second range of wavelengths includes a fourth range of wavelengths that differs from the third range of wavelengths during a second time period.

21. The method of claim 17 further comprising:
transmitting the first range of wavelengths onto a first modulation device; and
transmitting the second range of wavelengths onto a second modulation device.

22. The method of claim 21 wherein the second modulation device is configured to selectively reflect a first subset of the second range of wavelengths during a first time period, and wherein the second modulation device is configured to selectively reflect a second subset of the second range of wavelengths during a second time period.

23. A projection system comprising:
a first modulator;
a second modulator; and
a prism assembly that includes a first prism component, a second prism component, and a dichroic interface between the first and second prism components;
wherein the dichroic interface is configured to reflect a first range of wavelengths of light from an optical path from the first prism component off of a face of the first prism component and onto the first modulator, wherein the dichroic interface is configured to transmit a second range of wavelengths of the light from the first prism component into the second prism component and onto the second modulator, and wherein the second modulator is configured to modulate a first subset of the second range of wavelengths during a first period and a second subset of the second range of wavelengths during a second period that is subsequent to the first period.

24. The projection system of claim 23 wherein the first prism component has a triangular cross-section along the optical path, and wherein the second prism component has a quadrilateral cross-section along the optical path.

25. The projection system of claim 23 wherein the first prism is configured to receive the first subset of second range of wavelengths from a color wheel during the first time period, and wherein the first prism is configured to receive the second subset of second range of wavelengths from the color wheel during the second time period.

26. The projection system of claim 23 wherein the face of the first prism component is configured to totally internally reflect the first range of wavelengths of the light.

27. A prism assembly comprising:
a first prism component having at least first and second faces substantially orthogonal to an optical path;
a second prism component having at least third and fourth faces substantially orthogonal to the optical path;
a third prism component having at least fifth and sixth faces substantially orthogonal to the optical path;
a first dicbroic interface between at least a portion of the first and the third faces and along the sixth face and configured to reflect a first color of the light and transmit second and third colors of the light; and
a second dichroic interface between at least a portion of the second and the fifth faces and along the fourth face and configured to reflect the second and the third colors and transmit the first color.

28. The prism assembly of claim 27 wherein the first prism component includes a seventh face configured to totally internally reflect the first color between the first dichroic interface and a first modulator and the second and the third colors between the second dichroic interface and a second modulator.

29. The prism assembly of claim 28 wherein the second prism component includes an eighth face configured to totally internally reflect the first color between the first dichroic interface and the first modulator, and wherein the third prism component includes a ninth face configured to totally internally reflect the second and the third colors between the second dicbroic interface and the second modulator.

30. The prism assembly of claim 27 wherein the optical path comprises an illumination path.

31. The prism assembly of claim 27 wherein the optical path comprises an projection path.

* * * * *

UNITED STATES PATENT AND TRADEMARK OFFICE
CERTIFICATE OF CORRECTION

PATENT NO. : 7,300,156 B2  Page 1 of 1
APPLICATION NO. : 11/064165
DATED : November 27, 2007
INVENTOR(S) : Scott Lerner et al.

It is certified that error appears in the above-identified patent and that said Letters Patent is hereby corrected as shown below:

In column 3, line 59, delete "11A" and insert -- 110A --, therefor.

In column 8, line 27, delete "14B" and insert -- 114B --, therefor.

In column 8, line 43, delete "7.16" and insert -- 716 --, therefor.

In column 9, line 47, in Claim 1, delete "dicliroic" and insert -- dichroic --, therefor.

In column 12, line 37, in Claim 27, delete "dicbroic" and insert -- dichroic --, therefor.

In column 12, line 57, in Claim 29, delete "dicbroic" and insert -- dichroic --, therefor.

Signed and Sealed this

Eighth Day of July, 2008

JON W. DUDAS
*Director of the United States Patent and Trademark Office*